United States Patent
Dukart

(10) Patent No.: US 7,603,950 B2
(45) Date of Patent: Oct. 20, 2009

(54) DEVICE FOR IMPACT DETECTION

(75) Inventor: Anton Dukart, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/556,838

(22) PCT Filed: Mar. 13, 2004

(86) PCT No.: PCT/DE2004/000509

§ 371 (c)(1),
(2), (4) Date: Dec. 8, 2006

(87) PCT Pub. No.: WO2004/103778

PCT Pub. Date: Dec. 2, 2004

(65) Prior Publication Data

US 2007/0157700 A1 Jul. 12, 2007

(30) Foreign Application Priority Data

May 12, 2003 (DE) ................. 103 21 160

(51) Int. Cl.
*F42C 11/02* (2006.01)
*H01L 41/02* (2006.01)
(52) U.S. Cl. ............... 102/210; 310/311; 181/110; 181/122
(58) Field of Classification Search .......... 102/210; 310/311; 181/110, 122; 367/20, 155, 180; 73/1.48, 35.11, 632
See application file for complete search history.

(56) References Cited

U.S. PATENT DOCUMENTS

| 6,169,479 | B1 * | 1/2001 | Boran et al. ............ 340/436 |
| 6,329,910 | B1 | 12/2001 | Farrington |
| 6,534,999 | B2 | 3/2003 | Brown |
| 6,744,354 | B2 * | 6/2004 | Stephan et al. .......... 340/436 |
| 6,832,145 | B2 * | 12/2004 | Takafuji et al. .......... 701/45 |
| 7,137,472 | B2 * | 11/2006 | Aoki .................... 180/274 |
| 7,347,464 | B2 * | 3/2008 | Tanabe ..................... 293/4 |
| 7,488,015 | B2 * | 2/2009 | Lu et al. ................. 293/117 |
| 7,552,792 | B2 * | 6/2009 | Hawes et al. ............ 180/274 |
| 2002/0079905 | A1 * | 6/2002 | Brown .................. 324/543 |
| 2006/0196716 | A1 * | 9/2006 | Hawes et al. ............ 180/274 |

FOREIGN PATENT DOCUMENTS

| EP | 0 995 639 | 4/2000 |
| EP | 995639 A2 * | 4/2000 |
| GB | 2 317 707 | 4/1998 |
| GB | 2317707 A * | 4/1998 |
| WO | WO 01/15109 | 3/2001 |
| WO | WO 01/98117 | 12/2001 |

* cited by examiner

*Primary Examiner*—Bret Hayes
*Assistant Examiner*—Michael D David
(74) *Attorney, Agent, or Firm*—Kenyon & Kenyon LLP

(57) ABSTRACT

A piezo cable is provided as an impact sensor, which allows up to four different measuring principles. In addition to the piezoelectric measurement, which causes a piezoelectric pulse in an impact, a capacitive measurement, an inductive measurement and a resistance measurement are possible.

13 Claims, 4 Drawing Sheets

DEVICE FOR IMPACT DETECTION

BACKGROUND INFORMATION

It is known from PCT Publication No. WO 01/98117 to determine a pedestrian impact by resultant pressures or deformations and accelerations.

SUMMARY OF THE INVENTION

In contrast to the related art, the device for impact detection according to the present invention has the advantage that a piezo cable is now used for impact detection (protection). This piezo cable has the advantage of allowing various measuring principles, by themselves or in combination. Furthermore, a piezo cable is very reliable and simple in its function.

It is especially advantageous that the piezo cable is able to use up to four independent measuring principles for impact detection. Among these is a capacitive measuring method for characterizing an impact object with respect to its relative dielectric constant. This allows a simple differentiation between a person and an object. A second measurement may be carried out on the basis of the piezoelectric effect. Here, an impact results in a piezoelectric pulse, which is recordable. By analyzing the delay differences, it is then also possible to detect the impact location, in particular. This may be achieved by means of a delay line, for instance. This delay line may preferably be realized by a shield, which is configured as a wound wire.

Another advantageous measuring method that is possible when using the piezo cable is provided by the elastic elongation of the cable during an impact. The elongation causes a resistance change, which is measurable and thus utilizable for impact detection. A fourth possible measuring method is an inductive measurement if a shield of the piezo cable has an inductive design. In this way, the conductivity of the impact object is able to be characterized. This, too, allows a person to be differentiated from an object and a characterization of objects as well.

For the capacitive measurement, the piezo cable may have an additional shield, which is used as an electrode for detecting the capacitance change. This shield may have a cylindrical or semicylindrical design, thereby allowing an amplification of the directional effect. The electric fields of the cables are oriented toward the impact region. This directional effect improves the signal-noise ratio, in particular.

Moreover, it is advantageous that the signal that characterizes the resistance change is converted to a higher frequency so as not to interfere with other measurements. This allows a very simple separation of the measurements.

Furthermore, it is advantageous that the piezo cable is arranged in a bumper molding, which allows the piezo cable to be injected or clamped into the molding in an advantageous manner.

DETAILED DESCRIPTION

Figure 1:
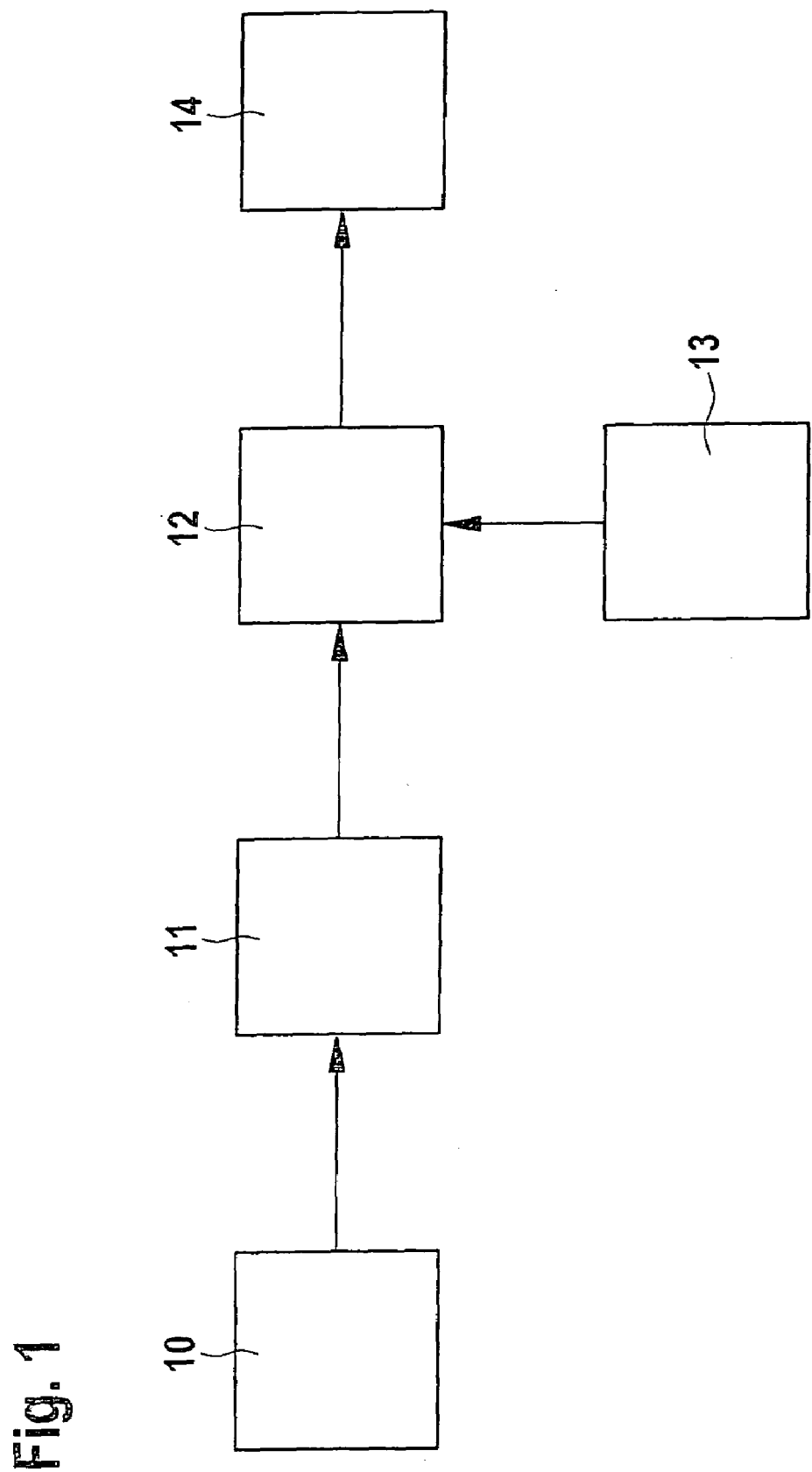
FIG. 1 shows a first block diagram of the device according to the present invention.

On the basis of a voluntary commitment by the ACEA (European Car Manufacturers), laws for the protection of pedestrians have been introduced in Europe.

A first stage will take effect starting with the year 2005. The demanded limit values will most likely be satisfiable by purely passive measures, i.e., the form design and cushioning of the vehicle front end.

The second step is to go into effect in the year 2010 and will pose considerably higher demands. Most vehicles will require active systems to comply with the limit values. As a result, there is increasing pressure to introduce an active system on the market.

Various concepts are available in the field of actuator systems as well as sensor systems. In connection with sensory systems, it is predominantly contact sensors, which are installed in the bumper, that are under consideration. Such sensors, which are based on a force measurement or deformation change, may extend across the entire width of the bumper. Examples of such force sensors are piezofoils, strain gauges, optical sensors or sensors from composite. Among the deformation sensors are light guides or simple switches. Furthermore, it is possible to affix various acceleration or force-measuring sensors directly on the so-called "crash box".

In addition, forward-directed sensors are conceivable as well, for instance radar-based or video sensors, which detect a pedestrian on the basis of the reflected signals or via image evaluation.

To protect pedestrians, airbag systems are essentially integrated in the engine compartment, or otherwise the engine hood is raised in order to appropriately counteract the impact of the person.

The contact sensors are generally unable to distinguish a garbage can or street light from a pedestrian. However, this constitutes the greatest disadvantage of all sensors for impact detection that are currently on the market. Therefore, every bump would cause additional damage by the pyroelectrically activated raising of the engine hood or also by the triggering of an airbag.

The area of the crash box is very susceptible to faults since a high degree of vehicle vibrations is transmitted here and a pedestrian impact must therefore be detected with great effort. In addition, not all vehicles come equipped with an integrated crash box. In this context, a crash box is a device which absorbs the crash impact energy and thereby protects the passengers from accidents.

The present invention provides a simple sensing concept for pedestrian protection, which not only constitutes a very inexpensive solution due to the simple structure, but which is also considerably less susceptible to faults because of the combination of the simultaneously analyzed electromagnetic fields.

Today's bumpers differ significantly from earlier designs in the wake of a number of laws regarding minimum speed impact without damage, pedestrian protection and, in particular, as a result of design compatibility demands. The metal shock absorber where the deformation energy is reduced in a serious accident, is welded to the elongated frame elements of the vehicle. A plastic trim is mounted on the shock absorber by a flexible coupling via elements, using screw bolts. The plastic panel is affixed on the chassis and on the plastic trim with the aid of the shock-absorber styrofoam or foamed plastic elements. As a result, the impact at the trim panel is heavily cushioned and transmitted to the shock absorber with a delay. The most sensitive, simplest and most universal location for the installation of the sensors is in the trim panel, which is provided in every vehicle.

Figure 3:
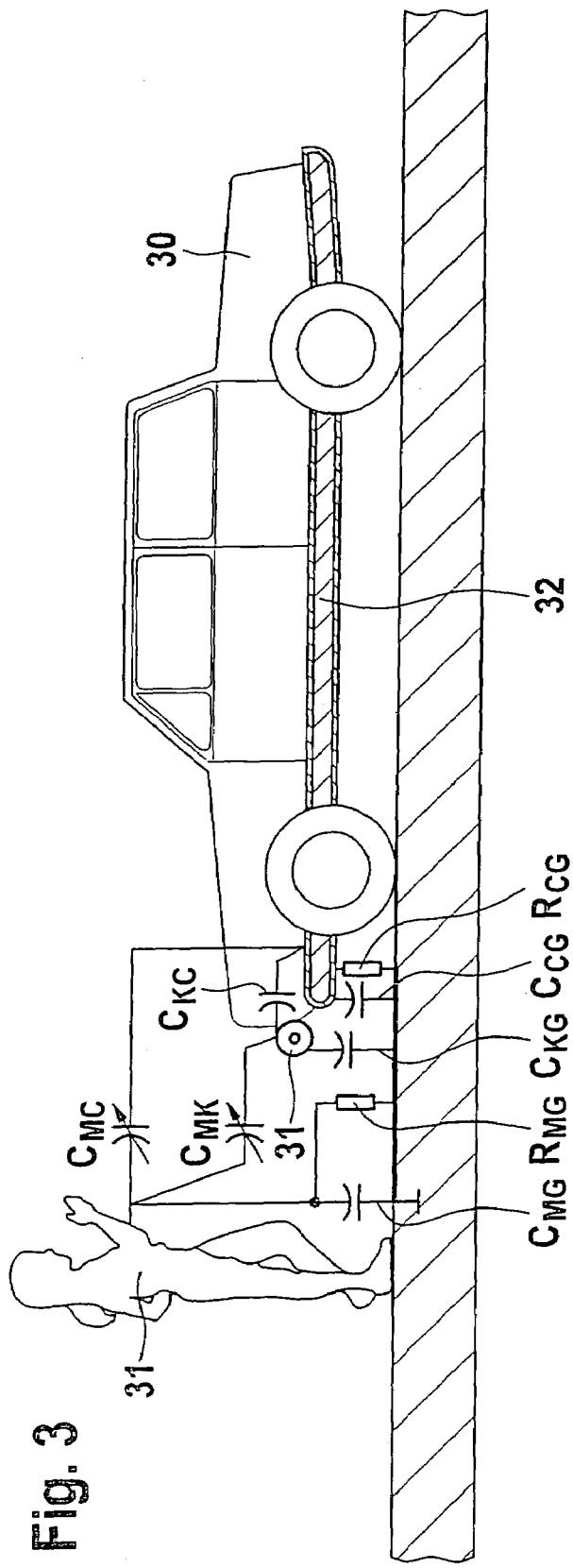
FIG. 3 shows a schematic representation to elucidate the capacitance measurement.

Today's bumper panels already include a number of injected inserts. When a modified piezo cable is injected into this trim panel, it is possible to detect in a capacitive manner, even prior to the precrash contact, whether a person having a relative dielectric constant of $\in_r=80$ or a conductive metal part or a trash can etc. is approaching. The first measuring principle the piezo cable is thus capable of implementing is the measurement of the capacitance change, as it is clearly shown in FIG. 3. A vehicle 30 has a piezo cable 31 on chassis 32 in the region of the bumper. This piezo cable has a shield as electrode for the capacitance evaluation, the shield extending across the conductor either in a cylindrical manner or as semicylinder. This increases the directional effect somewhat more. With respect to person 31, FIG. 3 indicates the various capacitances that occur between the person, denoted here by N, and the various vehicle elements. Capacitance CMC occurs between the person and the chassis, while capacitance CMK occurs between the person and the cable. Capacitance CKC is detected between the cable and the chassis, while capacitance CMG applies to the person and the ground. Shown in parallel to capacitance CMG is resistance RMG. The capacitance between the cable and the ground is capacitance CKG, and between the chassis and the ground the capacitance is CCG and, in parallel thereto, a resistance RCG is present. Capacitances CMC and CMK vary due based on the distance. In particular, the capacitances are a function of the relative dielectric constant, which especially in a person is determined by that person's water content. In the human body, this relative dielectric constant is $\in_r=80$. This capacitance measurement may have a range of more than 20 cm, depending on the configuration of the electrodes and the set sensitivity. The potential on the shield is measured with respect to ground, amplified, rectified and supplied to an evaluation via a band pass and a comparator. By comparison with stored values, which were determined from tests or simulations and analytical calculations, it is then possible to determine the relative dielectric constant. The impedance change of CMC and CMK is thus caused by the approach of a conductive or watery element, the dissipation factor allowing the two cases to be distinguished from one another. The impedance is made up of the following:

Z=Rp+i/(jωCp). The dissipation factor is the ratio Rp/ωCp. The dissipation factor expresses for capacitors that the insulation of the two surfaces is less than optimal. The piezo cable is designed as coaxial cable and has a polarized core insulator, which emits a load signal in a shock pulse (impact impulse), so that a piezoelectric pulse is present. This signal is then evaluated via a charge amplifier, followed by a band pass and comparator. The spatial resolution of the impact is obtained by the delay difference of the locally induced piezoelectric pulse. On the one side, it goes directly into a piezo line booster, and on the other side in the reverse direction to a terminating resistor of the piezo cable where it is reflected, reaching the input of the piezo cable evaluation as a function of the propagation speed. In this context, a shield is a wound wire having an inductivity of $$L := \frac{\pi \cdot D^2}{4 \cdot l} \cdot n^2 \cdot \mu_r \cdot \mu_0,$$

l being the length of the conductor, D the winding diameter, $\mu_r$ the relative permeability and n the winding number, and the capacitance $$C := \frac{(2 \cdot \pi \cdot \varepsilon_r \cdot \varepsilon_0 \cdot l)}{\ln\left(\frac{D}{d}\right)}$$

so that propagation speed $$v = \frac{1}{\sqrt{l*c}}$$

changes by a factor of approximately 120 with respect to the light velocity. The delay time is calculated at t=0.4 μs/m. The time difference between the first and the subsequent pulse provides the information regarding the impact location.

As a third effect, the longitudinal change of the cable core, i.e., the internal conductor, is utilized as a dynamic strain gauge, which changes its length in an impact and thus its resistance as well. For the evaluation it is useful to utilize a carrier frequency signal that can no longer interfere with the piezo signal since it is in a higher frequency range. Finally, due to the inductive design of the shield, another effect may be utilized in the object's approach of the piezo cable. Such an inductive cable is able to successfully differentiate between objects having good conductivity, for instance a car panel or bicycle, and objects having poorer conductivity such as a person or plastic.

FIG. 1 shows the device according to the present invention in a block diagram. Piezo cable 10 is connected to an evaluator 11 via a line. Evaluator 11 ascertains the afore-described measuring principles configured at the piezo cable, either merely one or a combination thereof, it also being possible to utilize all four measuring principles. The signal as a function of the evaluation will then be sent by evaluator 11 to a control device for restraining systems 12. The control device for restraining systems 12 also receives additional signals from another sensory system 13 such as a passenger compartment sensor system or other impact sensors such as acceleration sensors. Precrash sensors may be assigned to sensory system 13 as well. Furthermore, control device 12 itself has sensors too, in particular acceleration sensors so as to register an impact on its own and/or to implement a plausibility check of impact signals from an external sensor system. Control device 12 has a processor in which a trigger algorithm for the restraining means is running. The sensor signals are fed to this algorithm to then trigger restraining means 14 as a function of the evaluation of the algorithm. These restraining means 14 relate to restraining means in the passenger compartment, i.e., airbags and belt tighteners, as well as restraining means for the protection of pedestrians such as external airbags or the raisable front hood, for instance.

Figure 2:
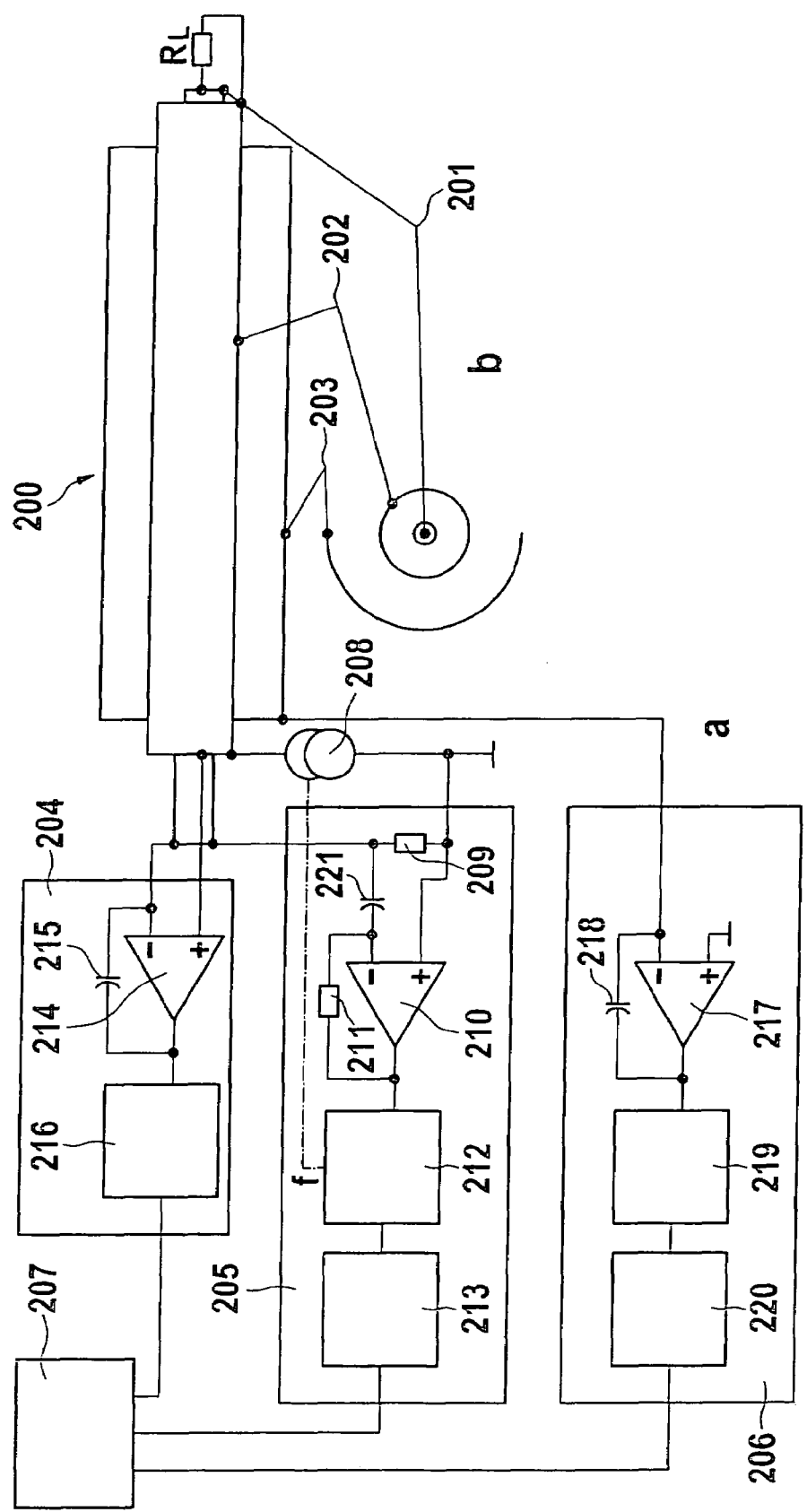
FIG. 2 shows a schematic representation of the device according to the present invention.

FIG. 2 shows the exact evaluation of three measuring principles configured at the piezo cable in a schematic representation. Here, the piezoelectric effect, the elongation of the piezo cable and the capacitive evaluation are utilized. This is illustrated by a block diagram in FIG. 2a, while FIG. 2b shows the structure in a section through the piezo cable. FIG. 2b and FIG. 2a each show a core 201, i.e., the inner conductor, which is surrounded by an inner shield 202 used for the piezoelectric measurement, this inner shield 202 being surrounded by another shield 203, which is utilized for the capacitive measurement. As an alternative, inner shield 202, by having an inductive design, may also be used for an inductive measurement so as to characterize an impact object via the conductivity. A resistor RL connects core 201 to inner shield 202. In order to achieve the highest possible reflection coefficient, it must be selected to be approximately 1000 times greater than the cable impedance, which is 75Ω.

The block diagram illustrates that inner conductor 201 is connected to a piezo line evaluation 204 on one side, and to a resistance evaluation 205 on the other side. In piezo line evaluation 204, the inner conductor is connected to a negative input of an operational amplifier 214 and a capacitor 215 on the one hand, and, in resistance evaluation 205, it is connected to a capacitor 221 and a resistor 209 on the other hand. Inner shield 202 is connected to the positive input of operational amplifier 214 on one side and to a frequency converter 208 on the other side. Outer shield 203 is connected to a capacitance evaluation 214 and here to a capacitor 218 and the inverting input of an operational amplifier 217. The non-inverting input of operational amplifier 217 is connected to ground. The other side of capacitor 218 is connected to the output of operational amplifier 217 and a phase-sensitive rectifier 219. Here, the voltage dropping in resistor 209 is demodulated in a phase-synchronous manner with respect to signal source 208, i.e., multiplied by +1 or −1.

Phase-sensitive rectifier 219 is connected to a band pass and a comparator 220. Via its output, block 220 is then connected to a logic circuit and a decision algorithm 207. Here, block 11 is evaluated. Frequency converter 208 converts the signal on shield 202 to a higher frequency and is connected to ground on one side, and to resistor 209 and the non-converting input of operational amplifier 210 on the other side. The other side of capacitor 221 is connected to the inverting input of operational amplifier 210 and resistor 211. Resistor 211 is again used as feedback resistor and is therefore connected to the output of operational amplifier 210 on the other side. Operational amplifier 210 is in turn followed by a phase-sensitive rectifier 212 and a band pass and comparator 213, which are then connected to logic circuit 207. Capacitor 215 is used as a feedback capacitor or it constitutes a charge amplifier together with operational amplifier 214. This is followed by a band pass and comparator 216, which in turn are connected to logic circuit 207. They establish the measuring bandwidth and the trigger threshold of the individual sensor.

Figure 4:
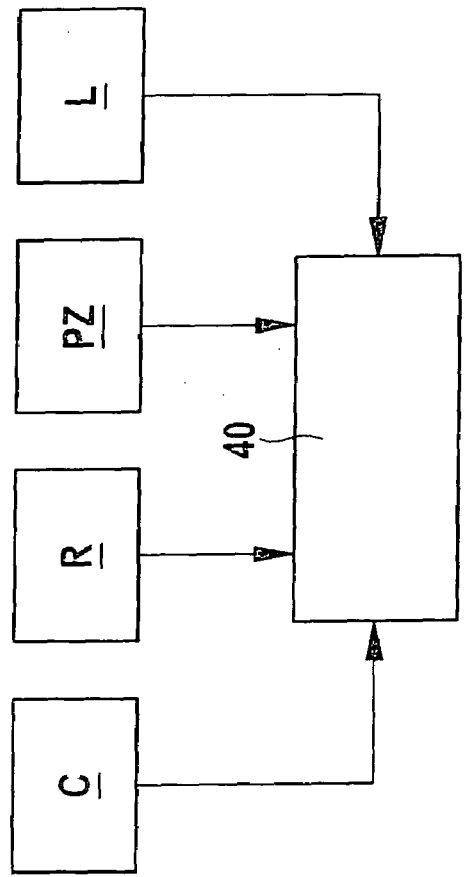
FIG. 4 shows a second block diagram of the device according to the present invention.

FIG. 4 shows the device according to the present invention in a block diagram. A capacitive evaluation C, a resistance change by longitudinal change R, a measurement of piezoelectric pulse Pz and an inductive measurement L as indicated above are connected to an evaluation 40. It is thus the case here that the piezo cable according to the present invention realizes all precontrolled measuring principles here, so that the impact object is able to be identified with a high degree of reliability and the impact location may be determined.

Figure 5:
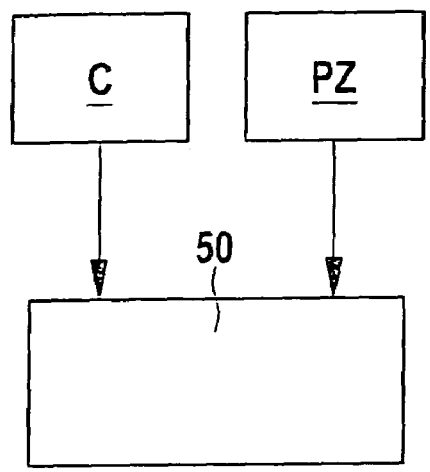
FIG. 5 shows a third block diagram of the device according to the present invention.

FIG. 5 shows a configuration of the device according to the present invention in which only capacitive measurement C and piezoelectric measurement Pz are present and connected to an evaluation 40.

Figure 6:
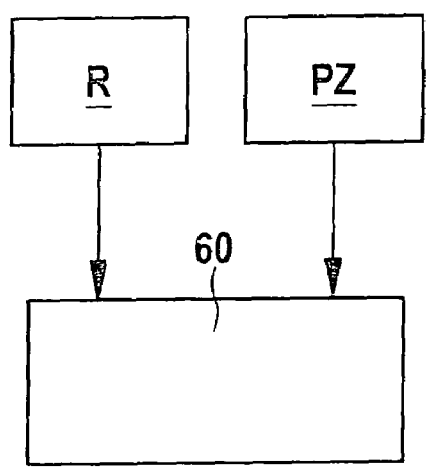
FIG. 6 shows a fourth block diagram of the device according to the present invention.

FIG. 6 shows the combination of resistance measurement R and piezoelectric measurement Pz, which are connected to evaluation 60. Additional combinations are possible here.

Figure 7:
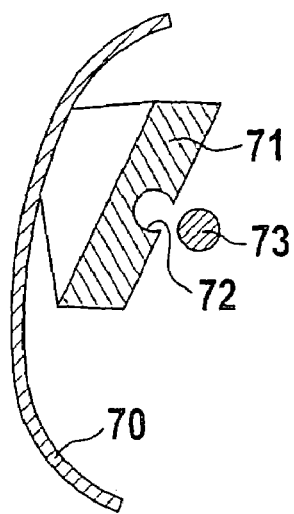
FIG. 7 shows a representation of the affixation of the piezo cable.

FIG. 7 illustrates the installation of the piezo cable inside the bumper. FIG. 7 shows an explosive view of the affixation location of the cable. A bumper 70 has an affixation region 71, in which a mounting support for cable 73 is provided. The cable may either be injected or clamped into the bumper molding.

If the piezo cable is used to utilize the four independent effects that are produced by four different physical effects, i.e., the effects of piezo electricity, the field change of the electrical field in the capacitance measurement, the field change in the inductivity and the resistance change via the change in the piezo resistivity of the inner conductor, it is possible to reliably distinguish the pedestrian from the other objects via plausibility analysis; the measuring effects may be analyzed simultaneously, the inductive or capacitive sensor reacting already prior to contact with the bumper and are therefore able to be utilized for triggering the piezoelectric or piezoresitive measurement.

What is claimed is:

1. A device for impact detection comprising:
at least one piezo cable, wherein the piezo cable is configured such that the device detects a capacitance change by an impact object with the aid of the piezo cable, and wherein the device is configured to characterize the relative static permittivity of the impact object based on the capacitance change.

2. The device according to claim 1, wherein the piezo cable includes a first shield as an electrode for detecting the capacitance change.

3. The device according to claim 2, wherein the first shield has one of a cylindrical and semicylindrical design.

4. The device according to claim 1, wherein the piezo cable is configured such that an impact causes a piezoelectric pulse.

5. The device according to claim 4, wherein the device achieves a spatial resolution of an impact by means of a delay-time measurement.

6. The device according to claim 5, wherein the piezoelectric pulse is evaluated directly, on the one hand, and is conveyed to an evaluation circuit via a delay line, on the other hand, so as to ascertain a delay time difference therefrom.

7. The device according to claim 6, wherein the piezo cable includes a second shield provided as a delay line, which is configured as a wound wire.

8. The device according to claim 7, wherein the second shield is configured to be inductive, to characterize an impact object with respect to its conductivity.

9. The device according to claim 1, wherein the piezo cable is configured such that it undergoes a longitudinal change in an impact, which causes a resistance change.

10. The device according to claim 9, wherein a signal characterizing the resistance change is converted to a higher frequency for evaluation.

11. The device according to claim 1, wherein the piezo cable is situated in a trim of a bumper.

12. The device according to claim 11, wherein the piezo cable is injected into the trim.

13. The device according to claim 11, wherein the piezo cable is clamped into the trim.

* * * * *

UNITED STATES PATENT AND TRADEMARK OFFICE
CERTIFICATE OF CORRECTION

PATENT NO.         : 7,603,950 B2                                              Page 1 of 1
APPLICATION NO.   : 10/556838
DATED              : October 20, 2009
INVENTOR(S)        : Anton Dukart It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 90 days.

Signed and Sealed this

Fifth Day of October, 2010

David J. Kappos
*Director of the United States Patent and Trademark Office*